United States Patent
Ito et al.

(10) Patent No.: US 10,493,775 B2
(45) Date of Patent: Dec. 3, 2019

(54) IMAGE FORMING METHOD AND INK SET

(71) Applicant: Brother Kogyo Kabushiki Kaisha, Nagoya-shi, Aichi-ken (JP)

(72) Inventors: Shinpei Ito, Nagoya (JP); Yasuhiro Taga, Kani (JP); Keisuke Yuhara, Nagoya (JP); Mitsunori Maeda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/159,874

(22) Filed: Oct. 15, 2018

(65) Prior Publication Data

US 2019/0111708 A1  Apr. 18, 2019

(30) Foreign Application Priority Data

Oct. 16, 2017  (JP) .................................. 2017-200323

(51) Int. Cl.
| | |
|---|---|
| *B41J 2/21* | (2006.01) |
| *B41J 3/407* | (2006.01) |
| *C09D 11/328* | (2014.01) |
| *C09D 11/54* | (2014.01) |
| *B41M 5/00* | (2006.01) |
| *D06P 5/30* | (2006.01) |

(52) U.S. Cl.
CPC .............. *B41J 3/4078* (2013.01); *B41J 2/21* (2013.01); *B41J 2/2114* (2013.01); *B41M 5/0017* (2013.01); *C09D 11/328* (2013.01); *C09D 11/54* (2013.01); *D06P 5/30* (2013.01)

(58) Field of Classification Search
CPC .......... B41J 2/21; B41J 2/2114; B41J 3/4078; B41M 5/0017; C09D 11/328; C09D 11/54; D06P 5/30
See application file for complete search history.

(56) References Cited

U.S. PATENT DOCUMENTS

| | | |
|---|---|---|
| 6,705,717 B1 | 3/2004 | Fujita et al. |
| 8,016,404 B2 | 9/2011 | Kato et al. |

(Continued)

FOREIGN PATENT DOCUMENTS

| | | |
|---|---|---|
| JP | H08-039793 A | 2/1996 |
| JP | 2000-290558 A | 10/2000 |

(Continued)

*Primary Examiner* — Anh T Vo
(74) *Attorney, Agent, or Firm* — Banner & Witcoff, Ltd.

(57) ABSTRACT

There is provided an image forming method for forming an image on a recording medium which is fabric or recording paper by using an ink set including an ink and a treatment agent. In a case that the recording medium is the fabric, the image forming method includes: applying the treatment agent, which includes a cationic substance and a water-soluble organic solvent, to the fabric in an application amount of the treatment agent per an area of the fabric in a range of 4.7 $mg/cm^2$ to 34 $mg/cm^2$; drying the applied treatment agent and thereby reducing weight of the treatment agent in the fabric to be not more than 50% of the application amount of the treatment agent; and jetting the ink, which includes an anionic dye and a water-soluble organic solvent, onto the fabric by an ink-jet system.

20 Claims, 4 Drawing Sheets

(56) References Cited

U.S. PATENT DOCUMENTS

| | | | |
|---|---|---|---|
| 2005/0244593 A1* | 11/2005 | Koga | B41M 5/52 |
| | | | 428/32.38 |
| 2008/0241398 A1 | 10/2008 | Kato et al. | |
| 2011/0227996 A1* | 9/2011 | Ikoshi | C09D 11/38 |
| | | | 347/21 |
| 2015/0251444 A1 | 9/2015 | Sayama et al. | |

FOREIGN PATENT DOCUMENTS

| | | |
|---|---|---|
| JP | 2008-246821 A | 10/2008 |
| JP | 2015-168147 A | 9/2015 |

\* cited by examiner

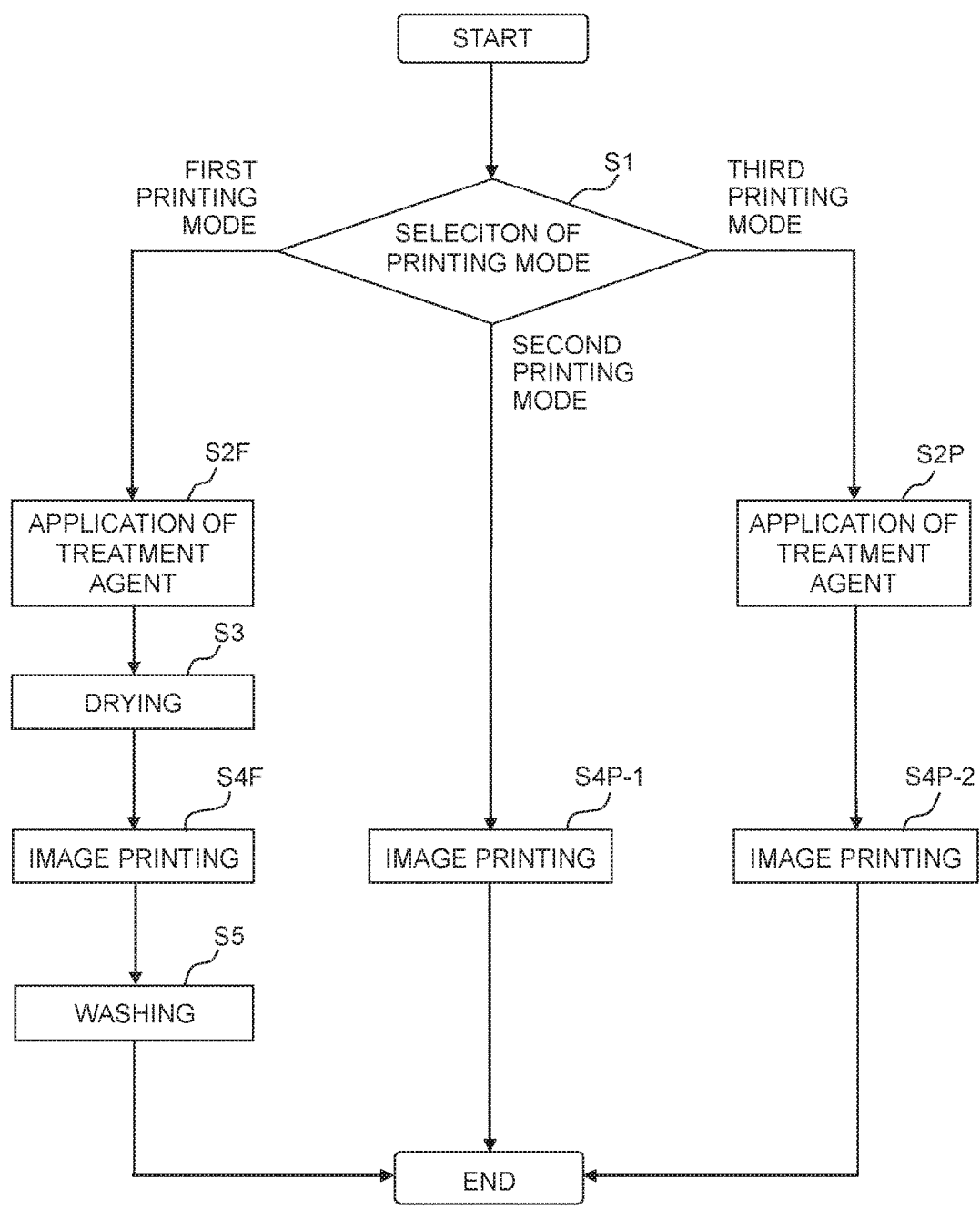

IMAGE FORMING METHOD AND INK SET

CROSS REFERENCE TO RELATED APPLICATION

The present application claims priority from Japanese Patent Application No. 2017-200323 filed on Oct. 16, 2017 the disclosure of which is incorporated herein by reference in its entirety.

BACKGROUND

Field of the Invention

The present invention relates to an image forming method and an ink set.

Description of the Related Art

There is suggested a variety of kinds of printing apparatus having a paper medium printing mode for performing printing with respect to a paper medium and a textile printing mode for performing printing with respect to a cloth medium (fabric medium) and capable of performing printing with respect to both of the paper medium and the cloth medium (see, for example, Japanese Patent Application Laid-open No. 2015-168147 corresponding to United States Patent Application Publication No. US2015/0251444).

However, in a case of performing printing of an image on fabric (cloth) by jetting (discharging) a dye ink with the ink-jet system, any bleeding (seeping) of the dye occurs more easily than in a case of performing printing of an image on a paper medium. In addition, the fabric is generally washed (cleaned) by water, and thus a printed matter obtained by performing printing on the fabric is required to have an excellent water resistance.

In view of the above situation, an object of the present teaching is to provide an image forming method which is capable of suppressing any bleeding of the dye in a printed matter in a case of performing printing of an image on a fabric (textile) by using a dye ink and by the ink-jet system, and is capable of improving the water resistance of the printed matter, and which is applicable also to printing of an image on recording paper; and to provide an ink set used in the image forming method.

SUMMARY

According to a first aspect of the present teaching, there is provided an image forming method for forming an image on a recording medium which is fabric or recording paper by using an ink set including an ink and a treatment agent, in a case that the recording medium is the fabric, the image forming method including:
  applying the treatment agent, which includes a cationic substance and a water-soluble organic solvent, to the fabric in an application amount of the treatment agent per an area of the fabric in a range of 4.7 mg/cm$^2$ to 34 mg/cm$^2$;
  drying the applied treatment agent and thereby reducing weight of the treatment agent in the fabric to be not more than 50% of the application amount of the treatment agent; and
  jetting the ink, which includes an anionic dye and a water-soluble organic solvent, onto the fabric by an ink-jet system,
  wherein the ink and the treatment agent satisfy the following expression (1):

$$(0.2 \times A1) + (0.8 \times A2) < 25 \tag{1}$$

in the expression (1),
  A1: a blending amount (% by weight) of a water-soluble organic solvent, of which boiling point is not less than 230° C., in an entire amount of the ink, and
  A2: a blending amount (% by weight) of a water-soluble organic solvent, of which boiling point is not less than 230° C., in an entire amount of the treatment agent.

According to a second aspect of the present teaching, there is provided an ink set including:
  an ink including an anionic dye and a water-soluble organic solvent; and
  a treatment agent including a cationic substance and a water-soluble organic solvent,
  wherein the ink and the treatment agent satisfy the following expression (1):

$$(0.2 \times A1) + (0.8 \times A2) < 25 \tag{1}$$

in the expression (1),
  A1: a blending amount (% by weight) of a water-soluble organic solvent, of which boiling point is not less than 230° C., in an entire amount of the ink, and
  A2: a blending amount (% by weight) of a water-soluble organic solvent, of which boiling point is not less than 230° C., in an entire amount of the treatment agent.

BRIEF DESCRIPTION OF THE DRAWINGS

FIG. 4 is a flow chart indicating an image forming method of the present teaching.

DESCRIPTION OF THE EMBODIMENTS

[Image Forming Method]

Figure 1:
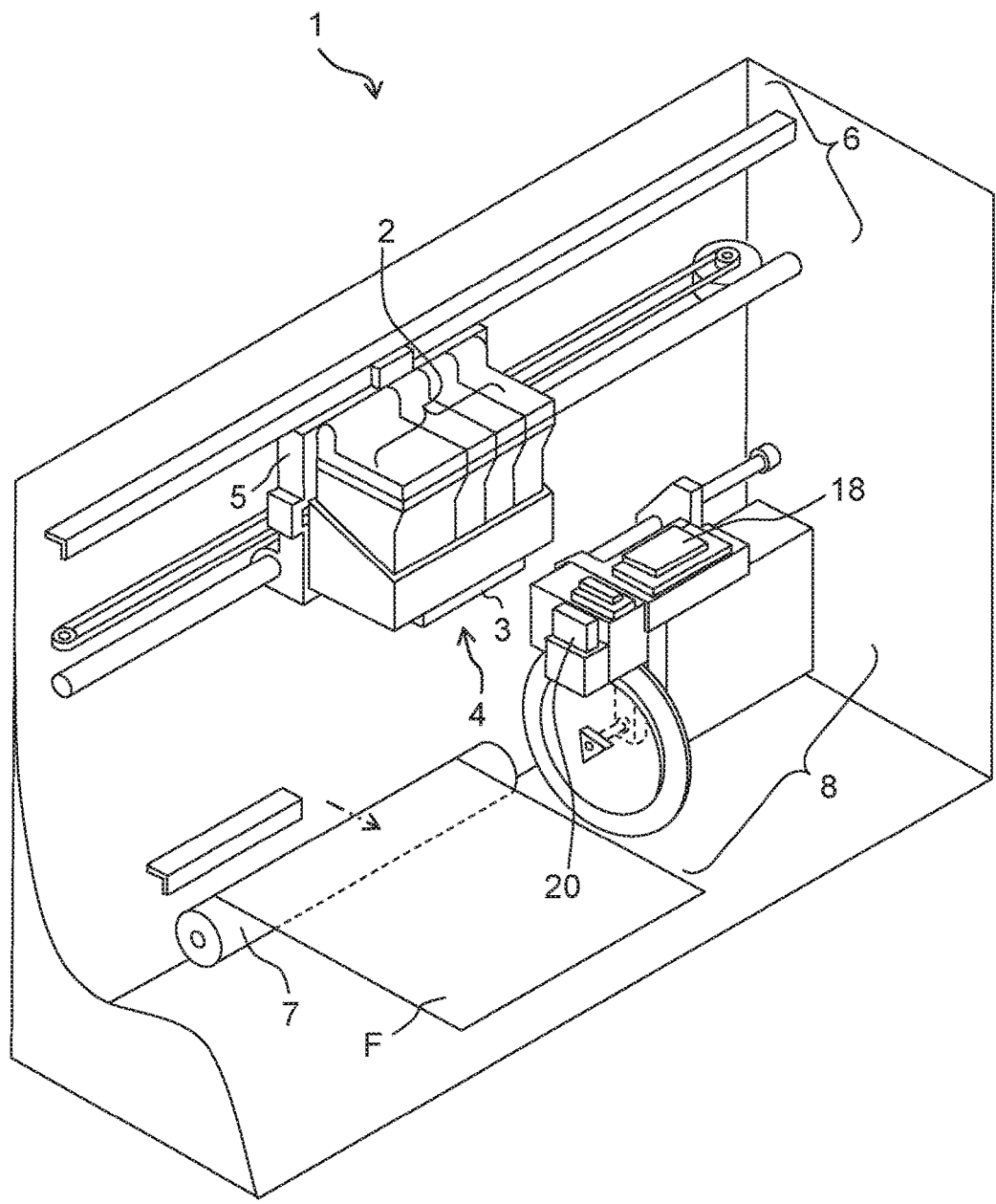
FIG. 1 is a schematic perspective view of an example of the configuration of an ink-jet recording apparatus of the present teaching.

An image forming method of the present teaching will be explained. The image forming method of the present teaching is an image forming method for forming an image on a recording medium which is fabric or recording paper (recording medium including fabric and recording paper) by using an ink, and the image forming method includes an image printing step. The fabric includes both of knit and textile. The material of the fabric may be either natural fiber or synthetic fiber. The natural fiber is exemplified, for example, by cotton, silk, etc. The synthetic fiber is exemplified, for example, by urethane, acrylic, polyester, nylon fibers, etc.

The image printing step is a step of printing the image by discharging (jetting) the ink onto the recording medium by means of the ink-jet system.

The ink contains (includes) an anionic dye and a water-soluble organic solvent.

The electric charge of the anionic dye is canceled by a cationic substance included in a treatment agent (to be described later on) and thus the anionic dye coagulates (aggregates) or becomes viscous. With this, it is assumed that the water resistance of a printed matter is improved, that the bleeding is suppressed, and further that the optical density (OD value) is improved. The anionic dye is not specifically limited, and is exemplified, for example, by a direct dye, an acidic dye, a reactive dye, a food dye, etc.

The direct dye is not specifically limited, and is exemplified, for example, by C. I. Direct Black, C. I. Direct Blue, C. I. Direct Red, C. I. Direct Yellow, C. I. Direct Orange, C. I. Direct Violet, C. I. Direct Brown, C. I. Direct Green, etc. C. I. Direct Black described above is exemplified, for example, by C. I. Direct Blacks 17, 19, 22, 31, 32, 51, 62, 71, 74, 108, 112, 113, 146, 154, 168, 195, etc. C. I. Direct Blue described above is exemplified, for example, by C. I. Direct Blues 1, 6, 15, 22, 25, 41, 71, 76, 77, 80, 86, 90, 98, 106, 108, 120, 158, 163, 168, 199, 226, etc. C. I. Direct Red described above is exemplified, for example, by C. I. Direct Reds 1, 2, 4, 9, 11, 17, 20, 23, 24, 28, 31, 39, 46, 62, 75, 79, 80, 83, 89, 95, 197, 201, 218, 220, 224, 225, 226, 227, 228, 229, 230, etc. C. I. Direct Yellow described above is exemplified, for example, by C. I. Direct Yellows 8, 11, 12, 24, 26, 27, 28, 33, 39, 44, 50, 58, 85, 86, 87, 88, 89, 98, 100, 110, 132, 142, 173, etc. C. I. Direct Orange described above is exemplified, for example, by C. I. Direct Oranges 34, 39, 44, 46, 60, etc. C. I. Direct Violet described above is exemplified, for example, by C. I. Direct Violets 47, 48, etc. C. I. Direct Brown described above is exemplified, for example, by C. I. Direct Brown 109, etc. C. I. Direct Green described above is exemplified, for example, by C. I. Direct Green 59, etc.

The acid dye is not specifically limited, and is exemplified, for example, by C. I. Acid Black, C. I. Acid Blue, C. I. Acid Red, C. I. Acid Yellow, C. I. Acid Orange, C. I. Acid Violet, etc. C. I. Acid Black described above is exemplified, for example, by C. I. Acid Blacks 2, 7, 24, 26, 31, 48, 51, 52, 63, 110, 112, 115, 118, 156, etc. C. I. Acid Blue described above is exemplified, for example, by C. I. Acid Blues 1, 7, 9, 15, 22, 23, 25, 29, 40, 43, 59, 62, 74, 78, 80, 90, 93, 100, 102, 104, 117, 120, 127, 138, 158, 161, 167, 220, 234, etc. C. I. Acid Red described above is exemplified, for example, by C. I. Acid Reds 1, 6, 8, 9, 13, 14, 18, 26, 27, 32, 35, 37, 42, 51, 52, 80, 83, 85, 87, 89, 92, 94, 106, 114, 115, 133, 134, 145, 158, 180, 198, 249, 256, 265, 289, 315, 317, etc. C. I. Acid Yellow described above is exemplified, for example, by C. I. Acid Yellows 1, 3, 7, 11, 17, 23, 25, 29, 36, 38, 40, 42, 44, 61, 71, 76, 98, 99, etc. C. I. Acid Orange described above is exemplified, for example, by C. I. Acid Oranges 7, 19, etc. C. I. Acid Violet described above is exemplified, for example, by C. I. Acid Violet 49, etc.

The reactive dye is not specifically limited, and is exemplified, for example, by C. I. Reactive Blue, C. I. Reactive Red, C. I. Reactive Yellow, etc. C. I. Reactive Blue described above is exemplified, for example, by C. I. Reactive Blues 4, 5, 7, 13, 14, 15, 18, 19, 21, 26, 27, 29, 32, 38, 40, 44, 100, etc. C. I. Reactive Red described above is exemplified, for example, by C. I. Reactive Reds 7, 12, 13, 15, 17, 20, 23, 24, 31, 42, 45, 46, 59, etc. C. I. Reactive Yellow described above is exemplified, for example, by C. I. Reactive Yellows 2, 3, 17, 25, 37, 42, etc.

The food dye is not specifically limited, and is exemplified, for example, by C. I. Food Black, C. I. Food Red, C. I. Food Yellow, etc. C. I. Food Black described above is exemplified, for example, by C. I. Food Blacks 1, 2, etc. C. I. Food Red described above is exemplified, for example, by C. I. Food Reds 87, 92, 94, etc. C. I. Food Yellow described above is exemplified, for example, by C. I. Food Yellow 3, etc.

In the present teaching, the anionic dye includes at least one selected from the group consisting of: a yellow dye, a magenta dye and a cyan dye; the yellow dye includes an azo dye; the magenta dye includes at least one of an azo dye and an anthrapyridone dye; and the cyan dye includes a phthalocyanine dye.

It is allowable that one kind of the anionic dye as described above is used singly, or two or more kinds of the anionic dye are used in combination. The blending amount of the anionic dye with respect to the entire amount of the ink is, for example, in a range of 0.1% by weight to 20% by weight, in a range of 1% by weight to 15% by weight, or in a range of 2% by weight to 10% by weight.

It is allowable that the ink includes a colorant different from the anionic dye or that the ink does not include a colorant different from the anionic dye. However, in view of improving the water resistance of a printed matter and the suppressing of bleeding in the printed matter, it is preferred that the ink includes, as the colorant, substantially only the anionic dye. The ratio of the anionic dye in the colorant is, for example, in a range of 90% by weight to 100% by weight, or in a range of 95% by weight to 100% by weight.

The water-soluble organic solvent included in the ink is exemplified, for example, by a humectant which prevents the ink from drying at an end of a nozzle in an ink-jet head, a penetrant which adjusts the drying velocity on a recording medium, etc.

The humectant included in the ink is not particularly limited, and is exemplified, for example, by lower alcohols such as methyl alcohol, ethyl alcohol, n-propyl alcohol, isopropyl alcohol, n-butyl alcohol, sec-butyl alcohol, tert-butyl alcohol, etc.; amides such as dimethylformamide, dimethylacetamide, etc.; ketones such as acetone; ketoalcohols (ketone alcohols) such as diacetone alcohol; ethers such as tetrahydrofuran and dioxane; polyethers such as polyalkylene glycol; polyvalent alcohols such as alkylene glycol, glycerol, trimethylolpropane, trimethylolethane, etc.; 2-pyrrolidone; N-methyl-2-pyrrolidone; 1,3-dimethyl-2-imidazolidinone; and the like. The polyalkylene glycol is exemplified, for example, by polyethylene glycol, polypropylene glycol, etc. The alkylene glycol is exemplified, for example, by ethylene glycol, propylene glycol, butylene glycol, diethylene glycol, triethylene glycol, dipropylene glycol, tripropylene glycol, thiodiglycol, hexylene glycol, etc. It is allowable that one kind of the humectant as described above is used singly, or two or more kinds of the humectant are used in combination. Among the above-described humectants, the humectant is preferably a polyvalent alcohol such as alkylene glycol, glycerol, etc.

The blending amount of the humectant with respect to the entire amount of the ink is, for example, in a range of 0% by weight to 95% by weight, in a range of 5% by weight to 80% by weight, or in a range of 5% by weight to 50% by weight. Note that, however, a blending amount of a humectant of which boiling point is not less than 230° C. and which is included in the ink needs to satisfy the expression (1) which will be described later on.

The penetrant included in the ink is exemplified, for example, by glycol ether. The glycol ether is exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, etc. One kind of the penetrant may be used singly, or two or more kinds of the penetrant may be used in combination.

The blending amount of the penetrant with respect to the entire amount of the ink is, for example, in a range of 0% by weight to 20% by weight, in a range of 0% by weight to 15% by weight, in a range of 1% by weight to 10% by weight, or in a range of 1% by weight to 5% by weight. Note that, however, a blending amount of a penetrant of which boiling point is not less than 230° C. and which is included in the ink needs to satisfy the following expression (1).

The ink may further include water. The water included in the ink is preferably ion-exchange water or purified water (pure water). The blending amount of the water with respect to the entire amount of the ink is, for example, in a range of 10% by weight to 90% by weight, in a range of 40% by weight to 80% by weight, or in a range of 50% by weight to 80% by weight. The blending amount of the water with respect to the entire amount of the ink may be, for example, a balance of the other components.

The ink may further include a conventionally known additive, as necessary. The additive is exemplified, for example, by surfactants, pH-adjusting agents, viscosity-adjusting agents, surface tension-adjusting agents, fungicides, etc. The viscosity-adjusting agents are exemplified, for example, by polyvinyl alcohol, cellulose, water-soluble resin, etc.

The ink can be prepared, for example, by uniformly mixing the anionic dye and the water-soluble organic solvent, and an optionally other additive(s) as necessary, by a conventionally known method, and then removing any non-dissolved matter, with a filter, etc.

The image printing step described above can be carried out, for example, by using an ink-jet recording apparatus of the present teaching as depicted in FIG. 1. As depicted in FIG. 1, the ink-jet recording apparatus (image forming apparatus) 1 includes, as main constitutive components, four ink cartridges (ink containers) 2, an ink jetting (discharging) mechanism (ink-jet head) 3, a head unit 4, a carriage 5, a driving unit 6, a platen roller 7, and a purge device 8. Further, the ink-jet recording apparatus 1 is provided with a controlling mechanism (controller, not depicted in the drawings) having a CPU, a ROM, a RAM, etc., and configured to control the respective parts, components or units of the ink-jet recording apparatus 1. Although not depicted in FIG. 1, the ink-jet recording apparatus 1 may further include, at appropriate positions, a treatment agent applying mechanism and a drying mechanism (which will be described later on).

Each of the four ink cartridges 2 contains one color ink of four color inks which are yellow, magenta, cyan, and black inks. For example, at least one of the four color inks is the ink used for the image forming method of the present teaching. In this exemplary embodiment, a set of the four ink cartridges 2 are depicted. However, in place of this four-ink cartridge set, it is also allowable to use an integrated type ink cartridge in which the interior thereof is comparted so that a yellow ink accommodating section, a magenta ink accommodating section, a cyan ink accommodating section, and a black ink accommodating section are formed. As a main body of the ink cartridge, for example, any conventionally known main body of an ink cartridge may be used.

The ink-jet head 3 disposed on the head unit 4 performs recording (image printing) on a recording medium (for example, fabric F). Note that the recording medium may be a recording medium other than (different from) the fabric F, such as recording paper (recording paper sheet, recording sheet), etc. The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application laid-open No. 2008-246821 corresponding to United States Patent Application Publication No. US2008/0241398 A1). The platen roller 7 extends in the reciprocating direction of the carriage 5 and is arranged to face the ink-jet head 3.

The purge device 8 sucks or draws unsatisfactory ink (poor ink) which contains air bubbles, etc., accumulated or trapped in the inside of the ink-jet head 3. As the purge device 8, it is possible to use, for example, a conventionally known purge device (for example, see Japanese Patent Application laid-open No. 2008-246821 corresponding to United States Patent Application Publication No. US2008/0241398 A1).

A wiper member 20 is provided on the purge device 8 at a position on the side of the platen roller 7 such that the wiper member 20 is adjacent to the purge device 8. The wiper member 20 is formed to have a spatula shape, and wipes a nozzle-formed surface of the ink-jet head 3 accompanying with the movement (reciprocating movement) of the carriage 5. In FIG. 1, a cap 18 is provided to cover a plurality of nozzles of the ink-jet head 3 which is returned to a reset position upon completion of recording (image printing), so as to prevent the inks from drying.

In the ink-jet recording apparatus 1 of the present embodiment, the four ink cartridges 2 are provided, together with the head unit 4, on one carriage 5. However, the present teaching is not limited to this. In the ink-jet recording apparatus 1, the respective four ink cartridges 2 may be provided on a carriage which is different (separate) from the carriage on which the head unit 4 is provided. Alternatively, the respective four ink cartridges 2 may be arranged and fixed inside the ink-jet recording apparatus 1, rather than being provided on the carriage 5. In such aspects, for example, the four ink cartridges 2 are connected to the head unit 4 provided on the carriage 5 with tubes, etc., and the inks are supplied from the four ink cartridges 2 via the tubes, respectively, to the head unit 4. Further, in these aspects, it is allowable to use four ink bottles having a bottle shape as the ink containers, instead of using the four ink cartridges 2. In such a case, each of the ink bottles is preferably provided with an inlet port via which the ink is poured from the outside to the inside of each of the ink bottles.

The image printing, with the use of the ink-jet recording apparatus 1, is performed, for example, as follows. At first, the recording medium (for example, fabric or the like) F is supplied from a supply tray (not depicted in FIG. 1) provided at a side portion or a lower portion of the ink-jet recording apparatus 1. The recording medium F is introduced into the space between the ink-jet head 3 and the platen roller 7. A predetermined recording (image printing) is performed on the introduced recording medium F with the ink(s) jetted or discharged from the ink-jet head 3. The recording medium F after having the recording (image printing) performed thereon is discharged from the ink-jet recording apparatus 1. A supply mechanism and a discharge mechanism for the recording medium F are omitted from the illustration in FIG. 1.

The apparatus shown in FIG. 1 adopts the serial type ink-jet head. However, the present teaching is not limited to or restricted by this. The ink-jet recording apparatus may be an apparatus which adopts a line type ink-jet head.

In a case that the recording medium is the fabric in the image forming method of the present teaching, the image forming method further includes a treatment agent applying step and a drying step. Note that in the image forming method of the present teaching, in a case that the recording medium is, for example, any recording medium which is different from the fabric, such as the recording paper or the like, the execution of the treatment agent applying step and the drying step is arbitrary. It is allowable that the treatment agent applying step and the drying step are performed or are not performed. For example, the image forming method of the present teaching may be such a method that only the image printing step is performed in a case that the recording medium is any recording medium which is different from the fabric.

The treatment agent applying step is a step of applying the treatment agent to the fabric. In a case that this step is carried out under a condition that the recording medium is any recording medium which is different from the fabric, the treatment agent is applied to the recording medium which is different from the fabric, instead of the fabric. There is not any limitation or restriction on the timing at which the treatment agent applying step is carried out. For example, the treatment agent may be applied prior to the discharge of the ink onto the recording medium. The ink may be previously discharged onto the recording medium, and then the treatment agent may be applied. The application of the treatment agent to the recording medium and the discharge of the ink onto the recording medium may be performed simultaneously.

The treatment agent includes a cationic substance and a water-soluble organic solvent.

The cationic substance is not specifically limited, and can be exemplified, for example, by cationic polymers, cationic surfactants, cationic inorganic fine particles, polyvalent metal salts, polyvalent metal ions, etc.

The cationic polymer is exemplified, for example, by a cationic polymer including a urethane structure, polyamine, polyallylamine, polyethyleneimine, polyvinylamine, polyvinylpyridine, polyethyleneimine-epichlorohydrin reaction product, polyamide-polyamine resin, polyamide-epichlorohydrin resin, cationic starch, polyvinyl alcohol, polyvinylpyrrolidone, polyamidine, cationic epoxy resin, polyacrylamide, polyacrylic acid ester, polymethacrylic acid ester, polyvinyl formamide, aminoacetalized polyvinyl alcohol, polyvinyl benzyl onium, dicyandiamide-formalin polycondensate, dicyandiamide-diethylenetriamine polycondensate, epichlorohydrin-dimethylamine addition polymer, dimethyldiallylammonium chloride-SO$_2$ copolymer, dimethyldiallylammonium chloride polymer, derivatives thereof, etc. Further, the cationic polymer described above is also exemplified, for example, by a polymer of single monomer or a copolymer of a plurality of monomers composed of at least one of water-soluble monomers including, for example, dimethylaminoethyl methacrylate (DM), methacryloyloxyethyl trimethyl ammonium chloride (DMC), methacryloyloxyethyl benzyl dimethyl ammonium chloride (DMBC), dimethylaminoethyl acrylate (DA), acryloyloxyethyl trimethyl ammonium chloride (DMQ), acryloyloxyethyl benzyl dimethyl ammonium chloride (DABC), dimethylaminopropyl acrylamide (DMAPAA), acrylamide propyl trimethyl ammonium chloride (DMAPAAQ), etc. Among them, the cationic polymer having the urethane structure, polyallylamine, and polyethyleneimine are preferred. In a case that the cationic polymer is included in an emulsion, the minimum film formation temperature (minimum film-forming temperature) of the cationic polymer is preferably not more than 50° C., and is more preferably not more than 25° C.

The cationic surfactant described above is exemplified, for example, by quaternary ammonium salt, quaternary ammonium ion, primary, secondary, and tertiary amine salt type compounds, alkylamine salt, dialkylamine salt, aliphatic amine salt, alkylpyridinium salt, imidazolinium salt, sulfonium salt, phosphonium salt, onium salt, etc. Specified examples of the cationic surfactant other than the quaternary ammonium salt and the quaternary ammonium ion are exemplified, for example, by hydrochlorides and acetates of laurylamine, palm amine, rosin amine and the like, cetylpyridinium chloride, cetylpyridinium bromide, dihydroxyethyllaurylamine, etc. Among them, quaternary ammonium salt and quaternary ammonium ion are preferred.

The quaternary ammonium salt is exemplified, for example, by a cationic compound represented by the formula (A).

(A)

In the formula (A), $R^1$ to $R^4$ are hydrocarbon groups each having 1 to 20 carbon atoms. $R^1$ to $R^4$ may be identical with one another or different from one another, and $X^-$ is an anion.

In the formula (A), $R^1$ to $R^3$ may be alkyl groups each having 1 to 5 carbon atoms. The alkyl group having 1 to 5 carbon atoms may have a straight chain or a branched chain, and can be exemplified, for example by: methyl group, ethyl group, n-propyl group, isopropyl group, n-butyl group, sec-butyl group, isobutyl group, tert-butyl group, n-pentyl group, isopentyl group, sec-pentyl group, 3-pentyl group, tert-pentyl group, etc. The alkyl group having 1 to 5 carbon atoms may have a substituent group such as halogen atom or the like. In the formula (A), $R^1$ to $R^3$ may be identical with one another or different from one another.

In the formula (A), $R^4$ may be an alkyl group having 6 to 30 carbon atoms. The alkyl group having 6 to 30 carbon atoms is exemplified, for example, by hexyl group, heptyl group, octyl group, nonyl group, decyl group, lauryl group (dodecyl group), tetradecyl group, cetyl group (hexadecyl group), etc. The alkyl group having 6 to 30 carbon atoms may have a substituent group such as halogen atom or the like, and may have either a straight chain or a branched chain.

In the formula (A), $X^-$ is an anion. Although the anion may be any anion, the anion may be exemplified, for example, by methylsulfate ion, ethylsulfate ion, sulfate ion, nitrate ion, acetate ion, dicarboxylate (for example, malate, itaconate and the like) ion, tricarboxylate (for example, citrate and the like) ion, hydroxide ion, halide ion, etc. In a case that $X^-$ is dicarboxylate ion or tricarboxylate ion, dicarboxylate ion or tricarboxylate ion is the counter ion for two or three quaternary ammonium ions (cations obtained by removing $X^-$ from the formula (A)).

The cationic compound represented by the formula (A) is exemplified, for example, by lauryltrimethylammonium sulfate, lauryltrimethylammonium chloride, cetyltrimethylammonium chloride, benzyldimethylalkylammonium chloride, etc. The cationic compound represented by the formula (A) may be privately prepared in-house, or any commercially available product may be used therefor. The commercially available product is exemplified, for example, by "Catiogen (trade name) TML", "Catiogen (trade name) TMP", and "Catiogen (trade name) ES-O" produced by DAI-ICHI KOGYO SEIYAKU CO., LTD. and "Benzalkonium chloride" produced by TOKYO KASEI KOGYO CO., LTD.

The quaternary ammonium ion is exemplified, for example, by a cation obtained by removing $X^-$ from the formula (A).

The cationic inorganic fine particles are not specifically limited, and are exemplified, for example, by cationic silica, cationic alumina, cationic zirconia, cationic ceria, etc. Among them, cationic silica is preferred. The cationic silica may be coated with alumina.

The average particle diameter of the cationic inorganic fine particles is, for example, in a range of 5 nm to 80 nm, in a range of 10 nm to 50 nm, or in a range of 10 nm to 30 nm. The average particle diameter can be determined, for example, by means of the BET method. In a case that the average particle diameter of the cationic inorganic fine particles is in the range of 10 nm to 30 nm, for example, it is possible to further suppress the color loss after the washing with water in the printed matter obtained by performing printing on the fabric which is polyester.

The cationic inorganic fine particles may be so-called pearl necklace-shaped (rosary-shaped) cationic inorganic fine particles having such a shape that a plurality of particles are connected to one another. The average particle diameter of the pearl necklace-shaped cationic inorganic fine particles is, for example, in a range of 80 nm to 200 nm or in a range of 110 nm to 170 nm. The average particle diameter of the pearl necklace-shaped cationic inorganic fine particles can be determined, for example, by the dynamic light scattering method. The average particle diameter per single particle of the pearl necklace-shaped cationic inorganic fine particles is not specifically limited, and is, for example, in a range of 10 nm to 30 nm.

The cationic inorganic fine particles may be privately prepared in-house, or any commercially available product may be used therefor. The commercially available product is exemplified, for example, by "ST-AK" (alumina-coated cationic silica, average particle diameter: 10 nm to 15 nm (BET method)), "ST-AK-N" (alumina-coated cationic silica, average particle diameter: 10 nm to 15 nm (BET method)), "ST-AK-PS-S" (pearl necklace-shaped alumina-coated cationic silica, average particle diameter: 110 nm to 170 nm (dynamic light scattering method), average particle diameter per single particle: 10 nm to 30 nm), "AS-520" (cationic alumina, average particle diameter: 15 nm to 30 nm (BET method)), "ST-AK-L" (alumina-coated cationic silica, average particle diameter: 40 nm to 50 nm (BET method)), "ST-AK-YL" (alumina-coated cationic silica, average particle diameter: 50 nm to 80 nm (BET method)), "ST-AK-XS" (alumina-coated cationic silica, average particle diameter: 4 nm to 6 nm (BET method)), "ST-AK-A" (alumina-coated cationic silica, average particle diameter: 10 nm to 15 nm (BET method)), "AS-100" (cationic alumina, average particle diameter: 6 nm to 10 nm (BET method)), "AS-200" (cationic alumina, average particle diameter: 7 nm to 15 nm (BET method)), "AS-550" (cationic alumina, average particle diameter: 25 nm to 40 nm (BET method)), "ZR-30AL" (cationic zirconia, average particle diameter: 5 nm to 10 nm (BET method)), and "CE-20A" (cationic ceria, average particle diameter: 8 nm to 12 nm (BET method)) produced by NISSAN CHEMICAL INDUSTRIES, LTD., etc.

The polyvalent metal salt is exemplified, for example, by aluminum chloride, aluminum bromide, aluminum sulfate, aluminum nitrate, aluminum acetate, barium chloride, barium bromide, barium iodide, barium oxide, barium nitrate, barium thiocyanate, calcium chloride, calcium bromide, calcium iodide, calcium nitrite, calcium nitrate, calcium dihydrogenphosphate, calcium thiocyanate, calcium lactate, calcium fumarate, calcium citrate, copper chloride, copper bromide, copper sulfate, copper nitrate, copper acetate, iron chloride, iron bromide, iron iodide, iron sulfate, iron nitrate, iron oxalate, iron lactate, iron fumarate, iron citrate, magnesium chloride, magnesium bromide, magnesium iodide, magnesium sulfate, manganese sulfate, manganese nitrate, manganese dihydrogenphosphate, manganese acetate, manganese salicylate, manganese benzoate, manganese lactate, nickel chloride, nickel bromide, nickel sulfate, nickel nitrate, nickel acetate, tin sulfate, titanium chloride, zinc chloride, zinc bromide, zinc sulfate, zinc nitrate, zinc thiocyanate, zinc acetate, etc. Among them, polyvalent metal salts of calcium and magnesium are preferred. Further, divalent metal salts are preferred in view of the degree of coagulation of the anionic dye included in the ink as described above.

The polyvalent metal ion is exemplified, for example, by aluminum ion, barium ion, calcium ion, copper ion, iron ion, magnesium ion, manganese ion, nickel ion, stannum ion, titanium ion, and zinc ion. Among them, calcium ion and magnesium ion are preferred. Further, divalent metal ion is preferred in view of the degree of coagulation of the anionic dye included in the ink as described above.

As the cationic substance, the cationic polymer having the urethane structure is particularly preferred among those as described above. The cationic polymer having the urethane structure includes, for example, a cationic unit such as organic amine, together with the urethane structure. The cationic polymer having the urethane structure may be privately prepared in-house, or any commercially available product may be used as the cationic polymer having the urethane structure.

The cationic polymer having the urethane structure may be, for example, an emulsion (urethane emulsion). Namely, the treatment agent may contain an emulsion of the cationic polymer having the urethane structure (urethane emulsion).

The cationic polymer having the urethane structure preferably has at least one of an acrylic structure and a styrene structure, and more preferably has the acrylic structure, together with the urethane structure.

The cationic polymer having the urethane structure is, for example, an emulsion, and preferably has at least one of the acrylic structure and the styrene structure together with the urethane structure, and more preferably has the acrylic structure together with the urethane structure (is more preferably a urethane acrylic emulsion). A commercially available product of the urethane acrylic emulsion is exemplified, for example, by "MOWINYL (trade name) 6910" manufactured by JAPAN COATING RESIN CO., LTD.; "SUPERFLEX (trade name) 620", "SUPERFLEX (trade name) 650" manufactured by DKS CO., LTD (DAI-ICHI KOGYO SEIYAKU CO., LTD); and the like.

It is preferred that a ratio of the urethane structure (a ratio of occupation of the urethane structure) is not less than 10% by weight, more preferably not less than 20% by weight in the cationic polymer having the urethane structure. Note that in a case that the cationic polymer having the urethane structure is the emulsion, the phrase that the "ratio of the urethane structure" means a ratio of the urethane structure in a solid content of the emulsion.

The weight average molecular weight of the cationic polymer having the urethane structure is, for example, in a range of 1000 to 500000 or in a range of 3000 to 500000. Note that in a case that the cationic polymer having the urethane structure is the emulsion, the weight average molecular weight is the weight average molecular weight of the solid content of the emulsion.

In the cationic polymer having the urethane structure described above, it is preferred that the urethane structure is obtained from aliphatic isocyanate and polyether-based polyol or polyester-based polyol.

One kind of the cationic substance as described above may be used singly, or two or more kinds of the cationic substance as described above may be used in combination. The blending amount of the cationic substance in the entire amount of the treatment agent is, for example, in a range of 0.5% by weight to 40% by weight, in a range of 0.5% by weight to 20% by weight, in a range of 0.9% by weight to 10% by weight, or in a range of 1% by weight to 10% by weight.

The water-soluble organic solvent included in the treatment agent is exemplified, for example, by a penetrant. The penetrant included in the treatment agent is exemplified, for example, by a penetrant similar to that as exemplified as the penetrant included in the ink as described above. The blending amount of the penetrant with respect to the entire amount of the treatment agent is, for example, in a range of 0.1% by weight to 20% by weight, in a range of 0.4% by weight to 10% by weight, in a range of 0.5% by weight to 10% by weight, or in a range of 1% by weight to 10% by weight. Note that, however, a blending amount of a penetrant of which boiling point is not less than 230° C. and which is included in the treatment agent needs to satisfy the expression (1) which will be described later on.

The treatment agent may further include a water-soluble organic solvent different from the above-described penetrant. The water-soluble organic solvent different from the above-described penetrant is exemplified, for example, by a humectant which is similar to that as exemplified as the humectant included in the ink as described above. The blending amount of the water-soluble organic solvent different from the penetrant with respect to the entire amount of the treatment agent is, for example, in a range of 0% by weight to 80% by weight, in a range of 1% by weight to 60% by weight, or in a range of 5% by weight to 40% by weight. Note that, however, a blending amount of a water-soluble organic solvent, which is different from the above-described penetrant, of which boiling point is not less than 230° C. and which is included in the treatment agent, needs to satisfy the expression (1) which will be described later on.

In the present teaching, the ink used in the image printing step and the treatment agent used in the treatment agent applying step satisfy the following expression (1). By satisfying the expression (1), it is possible to suppress, in a printed matter obtained by performing printing on fabric, any bleeding of the anionic dye included in the ink, after a long period of time has elapsed since the image formation.

$$(0.2 \times A1) + (0.8 \times A2) < 25 \quad (1)$$

in the expression (1),

A1: a blending amount (% by weight) of a water-soluble organic solvent, of which boiling point is not less than 230° C., in the entire amount of the ink, and A2: a blending amount (% by weight) of a water-soluble organic solvent, of which boiling point is not less than 230° C., in the entire amount of the treatment agent.

In a case that the ink or the treatment agent contains the water-soluble organic solvent of which boiling point is not less than 230° C., the water-soluble organic solvent of which boiling point is not less than 230° C. exists in a printed matter. The water-soluble organic solvent, of which boiling point is not less than 230° C., has low volatility, exists in the printed matter for a long period and penetrates into fibers of the fabric. It is assumed that the penetration of the solvent may cause bleeding of the anionic dye in the ink, after a long period of time has elapsed since the image formation. By satisfying the expression (1), it is assumed that an amount of the water-soluble organic solvent, of which boiling point is not less than 230° C., in the printed matter may be adjusted to suppress the bleeding of the anionic dye.

In the present teaching, the ink and the treatment agent preferably satisfy the following expression (2). In a case that the expression (2) is satisfied, it is possible to further suppress, in a printed matter obtained by performing printing on fabric, any bleeding of the anionic dye included in the ink, after a long period of time has elapsed since the image formation, and to further improve the water resistance of the printed matter.

$$(0.2 \times A1) + (0.8 \times A2) < 18 \quad (2)$$

in the expression (2),

A1: the blending amount (% by weight) of the water-soluble organic solvent, of which boiling point is not less than 230° C., in the entire amount of the ink, and A2: the blending amount (% by weight) of the water-soluble organic solvent, of which boiling point is not less than 230° C., in the entire amount of the treatment agent.

In the present teaching, the ink and the treatment agent preferably further satisfy the following expression (3) or (4)

$$0.4 < (0.2 \times A1) + (0.8 \times A2) \quad (3)$$

$$8.8 < (0.2 \times A1) + (0.8 \times A2) \quad (4)$$

in each of the expressions (3) and (4),

A1: the blending amount (% by weight) of the water-soluble organic solvent, of which boiling point is not less than 230° C., in the entire amount of the ink, and A2: the blending amount (% by weight) of the water-soluble organic solvent, of which boiling point is not less than 230° C., in the entire amount of the treatment agent.

Satisfying the expression (3) or (4) prevents the ink from drying at an end of a nozzle in an ink-jet head, thereby improving jetting stability, and also prevents the treatment agent from evaporating, thereby suppressing variation in proportion of the treatment agent caused by the evaporation of the treatment agent.

The boiling point of the water-soluble organic solvent of which boiling point is not less than 230° C. and which is included in the ink may be, for example, in a range of 230° C. to 380° C., or in a range of 230° C. to 290° C. It is allowable that the ink includes only one kind of the water-soluble organic solvent of which boiling point is not less than 230° C., or two or more kinds of the water-soluble organic solvent of which boiling point is not less than 230° C. It is allowable that the water-soluble organic solvent of which boiling point is not less than 230° C. and which included in the ink is same with or different from the water-soluble organic solvent of which boiling point is not less than 230° C. and which is included in the treatment agent. The water-soluble organic solvent of which boiling point is not less than 230° C. and which is included in the ink is, for example, glycerol (boiling point: 290° C.), triethylene glycol (boiling point: 287° C.), or triethylene glycol-n-butyl ether (boiling point: 272° C.). Although the blending amount (A1) of the water-soluble organic solvent of which boiling point is not less than 230° C. in the ink is not specifically limited provided that the value of the blending amount (A1) satisfies an expression (1), the blending amount (A1) is, for example, in a range of 0% by weight to 95% by weight, in a range of 5% by weight to 80% by weight, or in a range of 10% by weight to 50% by weight. Note that it is allowable that all of the water-soluble organic solvents included in the ink may be the water-soluble organic solvent of which boiling point is not less than 230° C.

The boiling point of the water-soluble organic solvent of which boiling point is not less than 230° C. and which is included in the treatment agent may be, for example, in a range of 230° C. to 380° C., or in a range of 230° C. to 290° C. It is allowable that the treatment agent includes only one kind of the water-soluble organic solvent of which boiling point is not less than 230° C., or two or more kinds of the water-soluble organic solvent of which boiling point is not less than 230° C. It is allowable that the water-soluble organic solvent of which boiling point is not less than 230° C. and which included in the treatment agent is same with or different from the water-soluble organic solvent of which boiling point is not less than 230° C. and which is included in the ink. The water-soluble organic solvent of which boiling point is not less than 230° C. and which is included in the treatment agent is, for example, glycerol (boiling point: 290° C.), or triethylene glycol-n-butyl ether (boiling point: 272° C.). Although the blending amount (A2) of the water-soluble organic solvent of which boiling point is not less than 230° C. in the treatment agent is not specifically limited, provided that the value of the blending amount (A2) satisfies the expression (1), the blending amount (A2) is, for example, in a range of 0% by weight to 30% by weight, or in a range of 5% by weight to 24% by weight.

Further, in a case that the ink and the treatment agent satisfy the above-described expression (1), it is allowable that the treatment agent does not include the water-soluble organic solvent of which boiling point is not less than 230° C. Similarly, in a case that the ink and the treatment agent satisfy the above-described expression (1), it is allowable that the ink does not include the water-soluble organic solvent of which boiling point is not less than 230° C. However, in view of suppressing the bleeding in the printed matter, it is preferred that both of the ink and the treatment agent each include the water-soluble organic solvent of which boiling point is not less than 230° C.

In the present teaching, a blending amount of a water-soluble organic solvent, of which boiling point is in a range of not less than 130° C. and less than 230° C., is preferably not more than 50% by weight, is more preferably in a range of 5% by weight to 40% by weight, in the entire amount of the treatment agent. The water-soluble organic solvent, of which boiling point is in the range of not less than 130° C. and less than 230° C., may be, for example, alkylene glycol or trimethylol alkyl, and preferably, propylene glycol, trimethylolethane or trimethylol propane.

The treatment agent may further include a surfactant different from the cationic surfactant. The surfactant different from the cationic surfactant is not specifically limited, and is exemplified, for example, by anionic surfactants produced by LION SPECIALTY CHEMICALS CO., LTD., including "LIPOLAN (trade name)" series, "LIPON (trade name)" series, "SUNNOL (trade name)" series, "LIPOTAC (trade name) series, ENAGICOL (trade name)" series, "LIPAL (trade name)" series, and "LOTAT (trade name)" series, etc.; anionic surfactants produced by KAO CORPORATION including "EMAL (trade name)" series, "LATEMUL (trade name)" series, "VENOL (trade name)" series, "NEOPELEX (trade name)" series, NS SOAP, KS SOAP, OS SOAP, and "PELEX (trade name)" series, etc.; anionic surfactants produced by SANYO CHEMICAL INDUSTRIES, LTD. including "SANDET (trade name)" series and "BEAULIGHT (trade name)" series, etc.; anionic surfactants produced by TOHO CHEMICAL INDUSTRY CO., LTD. including "ALSCOPE (trade name)" series, "NEOSCOPE (trade name)" series, "PHOSFANOL (trade name)" series, etc.; anionic surfactants produced by TOKYO CHEMICAL INDUSTRY CO., LTD., including sodium hexadecyl sulfate, sodium stearyl sulfate, etc.; nonionic surfactants produced by LION SPECIALTY CHEMICALS CO., LTD., including "DOBANOX (trade name)" series, "LEOCOL (trade name)" series, "LEOX (trade name)" series, "LAOL, LEOCON (trade name)" series, "LIONOL (trade name)" series, "CADENAX (trade name)" series, "LIONON (trade name)" series, "LEOFAT (trade name)" series, etc.; nonionic surfactants produced by KAO CORPORATION, including "EMULGEN (trade name)" series, "RHEODOL (trade name)" series, "EMASOL (trade name)" series, "EXCEL (trade name)" series, "EMANON (trade name)" series, "AMIET (trade name)" series, "AMINON (trade name)" series, etc.; nonionic surfactants produced by NISSHIN CHEMICAL CO., LTD., including "OLFIN (trade name)" series, etc.; and the like. It is allowable that one kind of the surfactant different from the cationic surfactant as described above is used singly, or two or more kinds of the surfactant different from the cationic surfactant are used in combination.

The surfactant which is included in the treatment agent and which is different from the cationic surfactant preferably includes a nonionic surfactant, and more preferably includes an acetylenic glycol-based nonionic surfactant represented by the following formula (S). In the formula (2), "m" and "n" may be identical to each other or different from each other, and may be numbers satisfying: m+n=1 to 15 and may be numbers, for example, satisfying: m+n=3 to 11. Each of $R^{11}$ to $R^{14}$ is an alkyl group having 1 to 5 carbon atoms. The alkyl group having 1 to 5 carbon atoms may have a straight chain or a branched chain, and is exemplified, for example, by a methyl group, an ethyl group, a n-propyl group, an isopropyl group, a n-butyl group, a sec-butyl group, an isobutyl group, a tert-butyl group, an n-pentyl group, an isopentyl group, a sec-pentyl group, a 3-pentryl group, a tert-pentyl group, etc. In the formula (S), $R^{11}$ to $R^{14}$ may be identical with one another or different from one another.

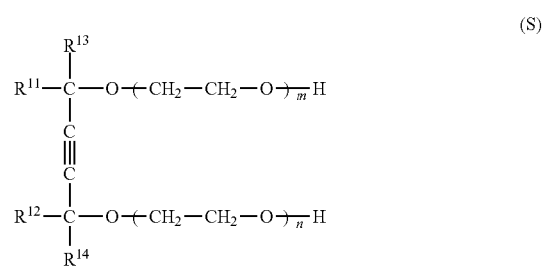

(S)

It is allowable to use, for example, any commercially available product as the acetylenic glycol-based nonionic surfactant represented by the formula (S). The commercially available product is exemplified, for example, by "OLFIN (trade name) E1004", "OLFIN (trade name) E1010", "SURFYNOL (trade name) 440", "SURFYNOL (trade name) 465" which are produced by NISSHIN CHEMICAL CO., LTD.; "ACETYLENOL (trade name) E40" and "ACETYLENOL (trade name) E100" produced by KAWAKEN FINE CHEMICALS CO., LTD.; and the like.

The blending amount of the surfactant, which is different from the cationic substance, in the entire amount of the treatment agent is, for example, in a range of 0.05% by weight to 10% by weight, in a range of 0.1% by weight to 5% by weight, or in a range of 0.2% by weight to 2% by weight.

The treatment agent may further include water. The water included in the treatment agent is preferably ion-exchange water or purified water (pure water). The blending amount of the water in the entire amount of the treatment agent may be, for example, a balance of the other components.

It is preferred that the treatment agent does not substantially contain any colorant such as a dye and a pigment, etc., so as not to influence the color (hue) of the printed matter. The blending amount of the colorant in the entire amount of the treatment agent is, for example, in a range of 0% by weight to 1% by weight, or in a range of 0% by weight to 0.1% by weight. Further, the treatment agent may be an aqueous treatment agent (treatment agent-liquid) or a gel treatment agent. In a case that the treatment agent is the aqueous treatment agent (treatment agent-liquid) or the gel treatment agent, the treatment agent can be easily coated on (applied to) the recording medium.

The treatment agent can be prepared, for example, by uniformly mixing the cationic substance and the water-soluble organic solvent, and an optionally other additive(s) as necessary, by a conventionally known method.

In the ink and the treatment agent as described above, a ratio (X/Z) of the blending amount (X: % by weight) of the cationic substance in the entire amount of the treatment agent to the blending amount (Z: % by weigh) of the anionic colorant in the entire amount of the water-based ink is preferably, for example, in a range of 0.1 to 20, in a range of 0.2 to 10, or in a range of 0.5 to 2. In a case that the above-described ratio (X/Z) is within this range, the cationic substance and the anionic colorant interact with each other more efficiently, thereby further improving the water resistance of the printed matter and further making it possible to suppress the bleeding.

In the treatment agent applying step, the application of the treatment can be performed, for example, by means of a spray system, stamp application, brush application, roller application, dipping (immersion in the treatment agent), the ink-jet system, etc. The application of the treatment agent may be performed, for example, by using a treatment agent applying mechanism, such as a spraying mechanism, provided on the ink-jet recording apparatus (image forming apparatus) of the present teaching. Alternatively, the application of the treatment agent may be performed at the outside of the ink-jet recording apparatus. Further, in a case that the application of the treatment agent is performed by means of the ink-jet system, the ink-jet head (ink jetting mechanism) in the image printing step may function also as the treatment agent applying mechanism.

Figure 3A:
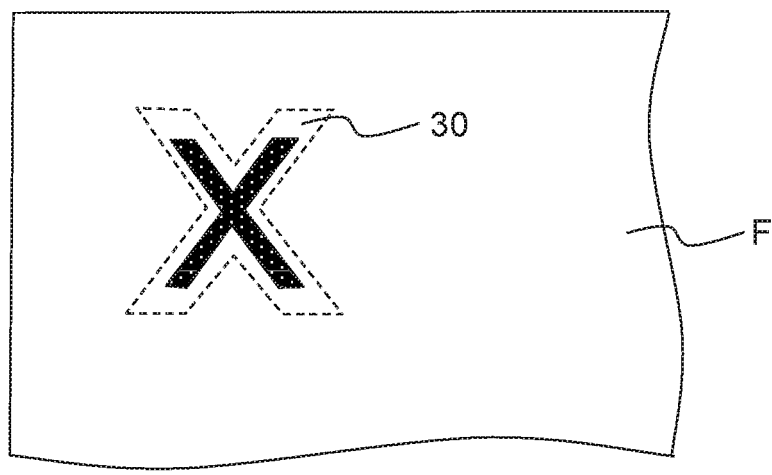
FIGS. 3A and 3B are each a view depicting an example of application of a treatment agent in an image forming method of the present teaching.
Figure 3B:
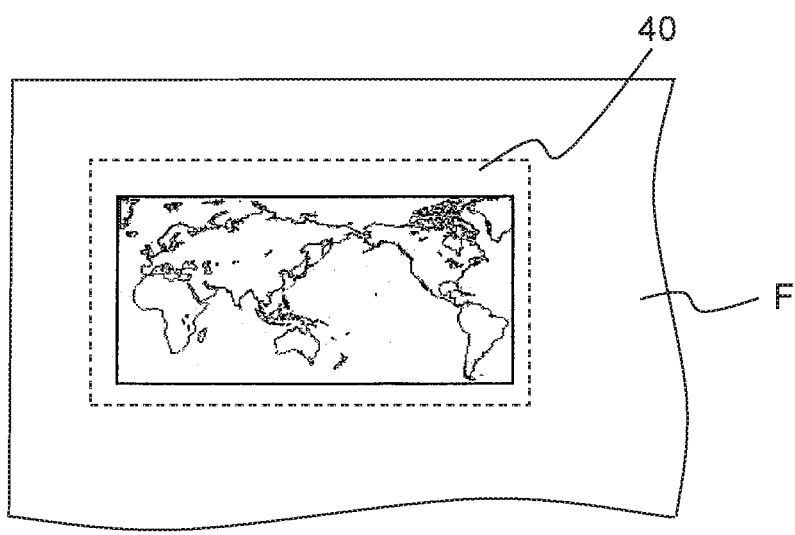

The treatment agent may be applied to the entirety (entire surface) or a part of the recording surface of the recording medium. In a case that the treatment agent is applied to the part of the recording surface, at least an image printing portion, of the recording surface of the recording medium, in which recording is (to be) performed by using the ink is an application portion for the treatment agent. In a case that the treatment agent is applied to the part of the recording surface, the size of the application portion is preferably larger than the image printing portion. For example, as depicted in FIG. 3A, in a case that an image of a letter "X" is formed on a recording medium F, the treatment agent is preferably applied so that an application portion 30 is formed to have a line width which is larger than a line width of the letter. Further, as depicted in FIG. 3B, in a case that an image of a pattern is printed on the recording medium F, the treatment agent is preferably applied so that an application portion 40 is formed to be larger than the pattern.

In the treatment agent applying step, an application amount of the treatment agent per an area of the fabric is made to be within a range of 4.7 mg/cm$^2$ (30 mg/inch$^2$) to 34 mg/cm$^2$ (220 mg/inch$^2$). By doing so, it is possible to suppress any bleeding of the dye in a printed matter obtained by performing printing on the fabric and to improve the water resistance of the printed matter. It is allowable, for example, that the controlling mechanism (controller, not depicted in the drawings) provided on the ink-jet recording apparatus 1 controls the treatment agent applying mechanism such that the application amount of the treatment agent is within the above-described range.

Next, the drying step is a step of drying the treatment agent applied in the treatment agent applying step. A time (timing) for performing the drying step is exemplified, for example, by a time (timing) before the image printing step, and a time (timing) after the image printing step; and the time before the image printing step is preferred. The drying may be, for example, air drying (natural drying). Alternatively, the drying may be performed by using any commercially available drying mechanism such as an iron, a hot press machine, a dryer, an oven, a belt conveyer oven, etc. The drying temperature at a time of performing the drying is, for example, in a range of 130° C. to 220° C., and the drying time (duration) is, for example, in a range of 30 seconds to 120 seconds. The drying temperature may be, for example, either a temperature of the drying atmosphere or a setting temperature of the drying mechanism.

Figure 2:
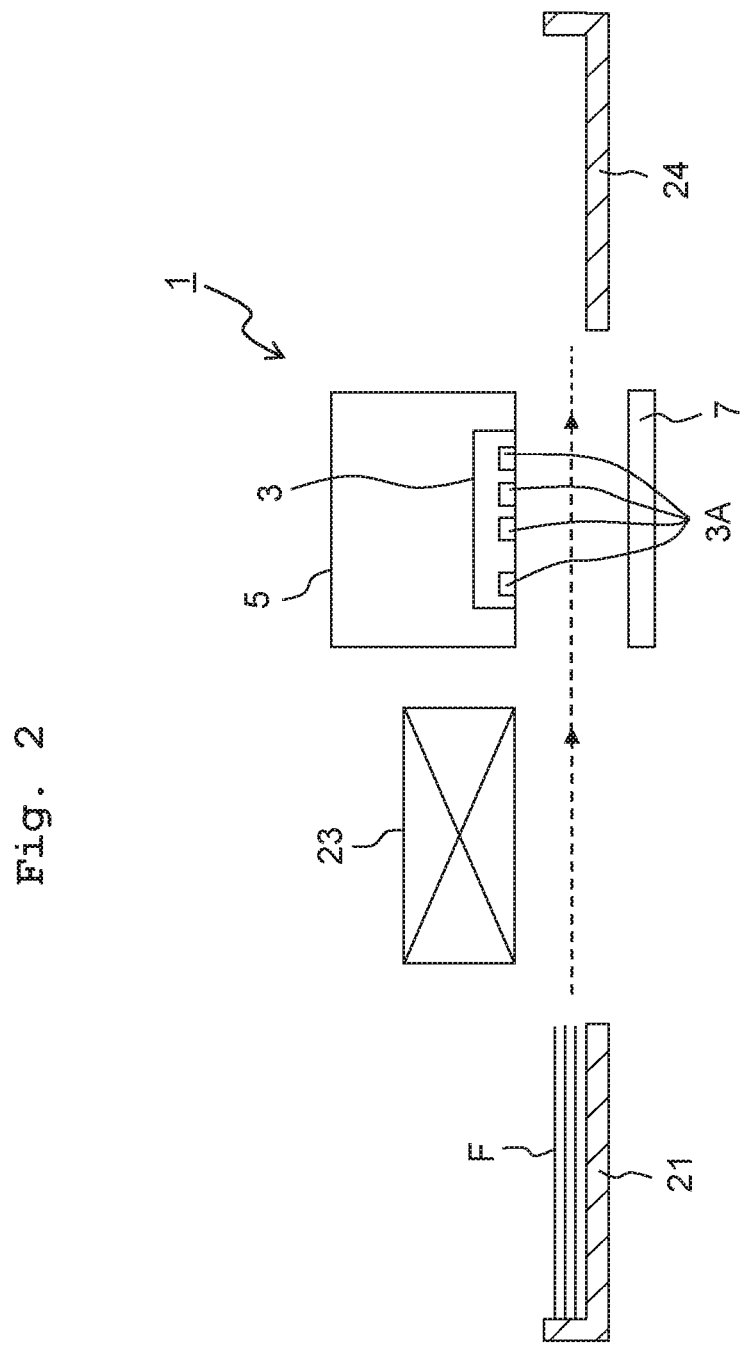
FIG. 2 is a schematic view of an example of the configuration of the ink-jet recording apparatus of the present teaching.

As depicted in FIG. 2, the drying step may be performed by using a drying mechanism 23 provided on the ink-jet recording apparatus 1, as depicted in FIG. 1, of the present teaching. Parts or portion in FIG. 2 which are the same as those depicted in FIG. 1 are assigned with the same reference numerals. Note that in FIG. 2, reference numerals 21 and 24 indicate a supply tray and a discharge tray of which illustration are omitted in FIG. 1; a reference numeral 3A indicates a plurality of nozzles formed in the lower surface of the ink-jet head 3. Further, the drying step may be performed at the outside of the ink-jet recording apparatus.

In the drying step, the weight of the applied treatment agent is reduced to be not more than 50% of the application amount, of the treatment agent, at a time at which the treatment agent has been applied (application time). With this, it is possible to suppress any bleeding of the anionic dye, which is included in the ink, in the printed matter obtained by performing printing on fabric. The drying step may be expressed also as a solvent-volatilizing step of volatilizing a solvent in the treatment agent (for example, the water, the water-soluble organic solvent, etc.) and/or a weight-reducing step of reducing the weight of the treatment agent. It is allowable that the controlling mechanism (controller, not depicted in the drawings) provided on the ink-jet recording apparatus 1 controls the drying mechanism 23 such that the weight of the applied treatment agent is reduced to be not more than 50% of the application amount, of the treatment agent, at the application time. More specifically, the controlling mechanism (controller, not depicted in the drawings) may control the setting temperature (the drying temperature) and/or an operating time (the drying time) of the drying mechanism 23.

In the drying step, it is preferred that the weight of the applied treatment agent is reduced to be not more than 50% of the application amount, of the treatment agent, at the application time. It is more preferred that the weight of the applied treatment agent is reduced to be not more than 30% of the application amount, of the treatment agent, at the application time. By doing so, it is possible to further suppress, in the printed matter obtained by performing printing on fabric, any bleeding of the anionic dye included in the ink, and to further improve the water resistance of the printed matter.

<Cleaning Step>

In a case that the recording medium is the fabric, the image forming method of the present teaching may further include a washing step of washing the fabric with water. In a case that the washing step is performed, the treatment agent applying step, the drying step, the image printing step and the washing step are preferably performed in this order. It is assumed that the anionic dye in the water-based ink makes contact with the cationic compound in the treatment agent to thereby cause the anionic dye to coagulate, etc., and that this improves the water resistance of a printed matter obtained by performing printing on the recording medium. On the other hand, in a case that the anionic dye which does not coagulate, etc., is present on the fabric, such an anionic dye is easily eluted into the water, which in turn does not allow the printed matter to have any sufficient water resistance. In view of such a situation, the washing step is provided after the image printing step so as to wash the anionic dye, which does not coagulate, etc., out from the fabric and to thereby make it possible to improve the water resistance of the printed matter.

Next, an explanation will be given about an example of the image forming method of the present teaching, in accordance with a flowchart indicated in FIG. 4. Note that the image forming method which will be explained below is merely an example, and the present teaching is not limited to or restricted by this example. Firstly, depending on the kind of the recording medium (fabric or recording paper), selection of printing mode is performed (step S1 of FIG. 4). In a case that the recording medium is the fabric, the controller of the image forming apparatus selects a "first printing mode (fabric printing mode)"; on the other hand, in a case that the recording medium is the recording paper, the controller of the image forming apparatus selects a "second printing mode (recording paper printing mode 1)" or a "third printing mode (recording paper printing mode 2)". For example, the controller of the image forming apparatus may determine as to which one among the "first printing mode", the "second printing mode" and the "third printing mode" is to be performed, in accordance with (based on) a signal inputted from a user interface. Alternatively, the controller may determine as to which one among the "first printing mode", the "second printing mode" and the "third printing mode" is to be performed, in accordance with (based on) a flag corresponding to the mode selected on the user interface.

In a case that the first printing mode (fabric printing mode) is selected, the treatment agent applying step (step S2F of FIG. 4), the drying step (step S3 of FIG. 4) and the image printing step (step S4F of FIG. 4) are performed in this order. It is allowable to further perform the washing step (step S5 of FIG. 4) after the image printing step (step S4F of FIG. 4). On the other hand, in a case that the second printing mode (recording paper printing mode 1) is selected, the image printing step (step S4P-1 in FIG. 4) is performed, without performing the above-described treatment agent applying step and drying step. In a case that the third printing mode (recording paper printing mode 2) is selected, the treatment agent applying step (step S2P of FIG. 4) and the image printing step (step S4P-2 of FIG. 4) are performed in this order.

The image forming method of the present teaching as described above may be performed by using an ink-jet recording apparatus provided with the treatment agent applying mechanism and/or the drying mechanism, or may be performed by using an ink-jet recording apparatus which is not provided with the treatment-agent applying mechanism and/or the drying mechanism. In a case that the image forming method is performed by using the ink-jet recording apparatus which is not provided with the treatment-agent applying mechanism and/or the drying mechanism, it is allowable, for example, that a user applies the treatment agent to the fabric and the recording paper by the spraying method, and/or that the user may dry the treatment agent applied to the fabric with an iron or a dryer.

As described above, by adjusting the blending amount of the treatment agent of which boiling point is not less than 230° C. in each of the ink and the treatment agent, the application amount of the treatment agent to the fabric, and by performing drying of the applied treatment agent such that the weight of the applied treatment agent is reduced to be not more than 50% of the application amount of the treatment agent at the application time, it is possible to suppress any bleeding of the dye in the printed matter obtained by performing printing on the fabric, and to improve the water resistance of the printed matter. Further, the image forming method of the present teaching is also possible to be applied for printing on the recording paper as well.

[Ink Set]

Next, an ink set of the present teaching will be explained.

The ink set of the present teaching is an ink set usable in the image forming method of the present teaching, the ink set including: an ink including an anionic dye and a water-soluble organic solvent; and a treatment agent including a cationic substance and a water-soluble organic solvent, wherein the ink and the treatment agent satisfy the above-described expression (1). The ink set of the present teaching is usable both for the recording on recording paper and the recording on fabric.

Regarding the ink and the treatment agent in the ink set of the present teaching, the explanation for the above-described image forming method can be quoted herein by reference.

EXAMPLES

Next, Examples of the present teaching are explained together with Comparative Examples. Note that the present teaching is not limited to or restricted by Examples and Comparative Examples described below.

[Preparation of Ink]

Respective components of Ink Composition (TABLE 1) were mixed uniformly or homogeneously; and thus a mixture was obtained. After that, the obtained mixture was filtrated through a polytetrafluoroethylene (PTFE) membrane filter (pore size 0.20 μm) produced by TOYO ROSHI KAISHA, LTD., and thus each of yellow inks Y1 and Y2 for ink-jet recording, a cyan ink C for ink-jet recording, and a magenta ink M for ink-jet recording was obtained.

TABLE 1

| | | | INKS | | | |
|---|---|---|---|---|---|---|
| | | | Y1 | Y2 | C | M |
| Ink Composition (% by weight) | Anionic dye | C.I. Direct Yellow 86 | 4.0 | 4.0 | — | — |
| | | C.I. Acid Blue 90 | — | — | 4.0 | — |
| | | C.I. Direct Red 83 | — | — | — | 4.0 |
| | Water-soluble organic solvent | boiling point (° C.) | | | | |
| | | Glycerol 290 | 20.0 | 20.0 | 20.0 | 20.0 |
| | | Triethylene glycol 287 | — | 10.0 | — | — |
| | | Triethylene glycol n-butyl ether 272 | 4.0 | 4.0 | 4.0 | 4.0 |
| | Nonionic surfactant | OLFIN (trade name) E1010 (*1) | 0.5 | 0.5 | 0.5 | 0.5 |
| | | Water | balance | balance | balance | balance |

TABLE 1 (following)-LEGEND
*1: Acetylenic glycol-based surfactant; produced by NISSHIN CHEMICAL CO., LTD; numerical values in Table 1 indicate active ingredient amounts.

[Preparation of Treatment Agent]

Respective components of Treatment Agent Composition (TABLE 2) were mixed uniformly or homogeneously; and thus nine (9) kinds of treatment agents 1 to 9 were obtained.

TABLE 2

| | | | TREATMENT AGENTS | | | | | | | | |
|---|---|---|---|---|---|---|---|---|---|---|---|
| | | | 1 | 2 | 3 | 4 | 5 | 6 | 7 | 8 | 9 |
| Treating Agent Composition (% by weight) | Cationic substance | Cationic urethane acrylic emulsion | 5.0 | 5.0 | 5.0 | 5.0 | 5.0 | — | — | — | — |
| | | Lauryltrimethyl ammonium sulfate | — | — | — | — | — | 5.0 | 5.0 | 5.0 | 5.0 |
| | Water-soluble organic solvent | boiling point (° C.) | | | | | | | | | |
| | | Glycerol 290 | 5.0 | 15.0 | 23.0 | 25.0 | 5.0 | 5.0 | 5.0 | 5.0 | — |
| | | Triethylene glycol n-butyl ether 272 | 1.0 | 1.0 | 1.0 | 1.0 | 1.0 | 1.0 | — | — | 1.0 |
| | | Diethylene glycol 245 | — | — | — | — | — | — | — | — | 25.0 |
| | | Propylene glycol 190 | 5.0 | 5.0 | 5.0 | 5.0 | 40.0 | 5.0 | 5.0 | 5.0 | 5.0 |
| | Nonionic surfactant | OLFIN (trade name) E1010 (*1) | — | — | — | — | — | — | 1.0 | — | — |
| | | Water | balance | balance | balance | balance | balance | balance | balance | balance | balance |

TABLE 2 (following)-LEGEND
*1: Acetylenic glycol-based surfactant; produced by NISSHIN CHEMICAL CO., LTD; numerical values in TABLE 2 indicate active ingredient amounts.

Example 1

An image was formed in a recording surface (image formation surface) of a recording medium F (cotton (sheeting)), in a following manner Namely, at first, the treatment agent 1 indicated in TABLE 2 was uniformly applied by using a spray to an image-formation portion of the recording surface (image formation surface) of the recording medium F (the treatment agent applying step). In this procedure, the application amount of the treatment agent 1 per an area was made to be 12.82 mg/cm². Subsequently, the applied treatment agent 1 was dried under a condition of 180° C. for 120 seconds by using an iron. By doing so, the weight of the applied treatment agent 1 was reduced up to be 23.2% of the application amount of the treatment agent at a time at which the treatment agent has been applied (application time) (drying step). Subsequently, an image was printed on the recording surface (image formation surface) of the recording medium F by jetting (discharging) the yellow ink Y1 indicated in TABLE 1 with the ink-jet recording apparatus 1 as depicted in FIG. 1 (image printing step). Note that the weight reduction rate of the treatment agent in the drying step was calculated by the following expression. Namely, the weight reduction rate of the treatment agent is a ratio of the treatment agent after the drying step to the application amount of the treatment agent at the application time.

Weight reduction rate of treatment agent (%)={(the weight of recording medium after the drying step−the weight of recording medium before the treatment agent applying step)/(the weight of recording medium after the treatment agent applying step−the weight of recording medium before the treatment agent applying step)}×100.

Examples 2 to 13 and Comparative Examples 1 to 6

In each of Examples 2 to 13 and Comparative Examples 1 to 6, an image was formed on a recording surface (image formation surface) of the recording medium F in a similar manner in Example 1, except that the combination of the ink and the treatment agent, the application amount of the treatment agent, the drying time and temperature, and the weight reduction rate of the treatment agent in the drying step were changed as indicated in TABLE 3 and TABLE 4.

With respect to each of Examples 1 to 13 and Comparative Examples 1 to 6, (a) Evaluation of water resistance, (b) Evaluation of bleeding of dye immediately after the image formation, and (c) Evaluation of bleeding of dye after elapse of a long period of time (since the image formation) were performed by the following methods, respectively.

(a) Evaluation of Water Resistance

The recording medium F was washed with water for 5 minutes while shaking the recording medium F in water to such an extent that a part of the recording medium F was not rubbed with another part of the recording medium F. After the washing with water, the optical density (OD value) of the image-formation portion of the recording surface (image formation surface) of the recording medium F obtained by being dried was measured by using a spectrophotometer Spectro Eye produced by X-RITE (light source: $D_{50}$, field angle: 2°, ANSI-T) to calculate the difference (ΔOD) in the optical density (OD value) of the recording medium F before and after the washing with water (ΔOD=OD value after washing with water−OD value before washing with water), and the evaluation was performed therefor in accordance with the following criterion for evaluation.

<Criterion for Evaluation of Water Resistance>

AA: The ΔOD was not less than −0.06.

A: The ΔOD was in a range of not less than −0.10 and less than −0.06.

C: The ΔOD was less than −0.10.

(b) Evaluation of Bleeding of Dye Immediately After Image Formation

The image-formation portion of the recording surface (image formation surface) of the recording medium F immediately after the image formation was visually observed, and the evaluation was performed therefor in accordance with the following criterion for evaluation.

<Criterion for Evaluation of Bleeding of Dye Immediately after Image Formation>

AA: The bleeding of the dye was hardly observed.

A: The bleeding of the dye was slightly observed (there was a portion in which the dye bled from an end portion of a part printed with a solid color).

C: The bleeding of the dye was conspicuous (there were many portions in which the dye bled from the end portion of the part printed with the solid color).

(c) Evaluation of Bleeding of Dye After Elapse of a Long Period of Time

The image-formation portion of the recording surface (image formation surface) of the recording medium F after the recording medium F had been stored for one week under an environment of temperature: 30° C., relative humidity: 80%, and the evaluation was performed therefor in accordance with the following criterion for evaluation.

<Criterion for Evaluation of Bleeding of Dye After Elapse of a Long Period of Time>

AA: The bleeding of the dye was hardly observed.

A: The bleeding of the dye was slightly observed (there was a portion in which the dye bled from an end portion of a part printed with a solid color).

C: The bleeding of the dye was conspicuous (there were many portions in which the dye bled from the end portion of the part printed with the solid color).

TABLES and TABLE 4 indicate the combination of ink and treatment agent, the value of (0.2×A1)+(0.8×A2), the application amount of the treatment agent, the drying time and temperature, and the weight reduction rate of the treatment agent in the drying step in each of Examples 1 to 13 and Comparative Examples 1 to 6.

TABLE 3

| | EXAMPLES | | | | | | |
|---|---|---|---|---|---|---|---|
| | 1 | 2 | 3 | 4 | 5 | 6 | 7 |
| Ink | Y1 | Y1 | Y1 | Y1 | Y1 | Y1 | Y1 |
| Treatment Agent | 1 | 1 | 1 | 1 | 1 | 2 | 3 |
| (0.2 × A1) + (0.8 × A2) | 9.6 | 9.6 | 9.6 | 9.6 | 9.6 | 17.6 | 24.0 |
| Application amount of treatment agent (mg/cm²) | 13 | 4.7 | 34 | 13 | 13 | 13 | 13 |
| Drying temperature (° C.) | 180 | 180 | 180 | 180 | 180 | 180 | 180 |
| Drying time (second) | 120 | 120 | 120 | 60 | 30 | 120 | 120 |
| Weight reduction rate of treatment agent (%) | 22.8 | 21.7 | 27.6 | 30.0 | 50.0 | 27.1 | 33.9 |
| Water Resistance | AA | A | AA | AA | A | AA | A |
| Bleeding of dye immediately after image formation | AA | AA | A | AA | A | AA | AA |
| Bleeding of dye after elapse of a long period of time | AA | AA | AA | AA | AA | AA | A |

| | EXAMPLES | | | | | |
|---|---|---|---|---|---|---|
| | 8 | 9 | 10 | 11 | 12 | 13 |
| Ink | Y1 | Y1 | Y1 | Y1 | C | M |
| Treatment Agent | 5 | 6 | 7 | 8 | 1 | 1 |
| (0.2 × A1) + (0.8 × A2) | 9.6 | 9.6 | 8.8 | 8.8 | 9.6 | 9.6 |
| Application amount of treatment agent (mg/cm²) | 13 | 13 | 13 | 13 | 13 | 13 |
| Drying temperature (° C.) | 180 | 180 | 180 | 180 | 180 | 180 |
| Drying time (second) | 120 | 120 | 120 | 120 | 120 | 120 |
| Weight reduction rate of treatment agent (%) | 30.1 | 23.2 | 22.8 | 21.4 | 22.6 | 19.2 |
| Water Resistance | AA | AA | AA | A | AA | AA |

TABLE 3-continued

| | | | | | | |
|---|---|---|---|---|---|---|
| Bleeding of dye immediately after image formation | AA | AA | AA | AA | AA | AA |
| Bleeding of dye after elapse of a long period of time | AA | AA | AA | AA | AA | AA |

TABLE 4

| | COMPARATIVE EXAMPLES | | | | | |
|---|---|---|---|---|---|---|
| | 1 | 2 | 3 | 4 | 5 | 6 |
| Ink | Y1 | Y1 | Y1 | Y1 | Y2 | Y1 |
| Treatment Agent | 1 | 1 | 1 | 4 | 3 | 9 |
| (0.2 × A1) + (0.8 × A2) | 9.6 | 9.6 | 9.6 | 25.6 | 26.0 | 25.6 |
| Application amount of treatment agent (mg/cm$^2$) | 4.4 | 35 | 13 | 13 | 13 | 13 |
| Drying temperature (° C.) | 180 | 180 | 180 | 180 | 180 | 180 |
| Drying time (second) | 120 | 120 | 25 | 120 | 120 | 120 |
| Weight reduction rate of treatment agent (%) | 20.7 | 28.4 | 51.5 | 34.3 | 29.4 | 31.7 |
| Water Resistance | C | AA | A | A | AA | AA |
| Bleeding of dye immediately after image formation | AA | C | C | AA | AA | AA |
| Bleeding of dye after elapse of a long period of time | AA | A | AA | C | C | C |

As indicated in TABLE 3, the results in the evaluations of the water resistance, the bleeding of dye immediately after the image formation and the bleeding of dye after elapse of a long period of time were all satisfactory in each of Examples 1 to 13. Further, the image forming method of each of Examples 1 to 13 was applicable also to a recording paper (recording paper sheet). Namely, an image forming method similar to that in Examples 1 to 13 was performed by using a recording paper instead of using the fabric, it was possible to obtain a printed matter which had a high optical density (OD value) and in which the bleeding of dye was suppressed.

Comparison will be made among Examples 1, 4 and 5 which are different from one another in the drying time and in the weight reduction rate of the treatment agent in the drying step, and similar to one another in the remaining conditions different from the above. In each of Example 1 and Example 4 in which the weight reduction rate of the treatment agent in the drying step was made to be not more than 30.0% (Example 1: 22.8%; Example 4: 30.0%) had further satisfactory results in the evaluations of the water resistance and the bleeding of dye immediately after the image formation than those in Example 5 in which the weight reduction rate of the treatment agent in the drying step was made to be 50.0%.

Comparison will be made among Examples 1, 6 and 7 which are different from one another in the value of (0.2×A1)+(0.8×A2) and in the weight reduction rate of the treatment agent in the drying step, and similar to one another in the remaining conditions different from the above. In Example 1 in which the value of (0.2×A1)+(0.8×A2) was 9.6 and which satisfied the above-described expression (2) and Example 6 in which the value of (0.2×A1)+(0.8×A2) was 17.6 and which satisfied the above-described expression (2), the results in the evaluations of the water resistance and the bleeding of dye after elapse of a long period of time since the image formation were further satisfactory than those in Example 7 in which the value of (0.2×A1)+(0.8×A2) was 24.0 and which did not satisfy the expression (2). Note that in each of Examples 1 and 6, the weight reduction rate was not more than 30%.

On the other hand, Comparative Example 1 in which the application amount of the treatment agent was made to be 4.4 mg/cm$^2$ had an unsatisfactory result in the evaluation of water resistance. Further, in Comparative Example 2 in which the application amount of the treatment agent was made to be 35 mg/cm$^2$ had an unsatisfactory result in the evaluation of the bleeding of dye immediately after the image formation. Furthermore, in Comparative Example 3 in which the weight reduction rate of the treatment agent in the drying step was made to be 51.5% had an unsatisfactory result in the evaluation of the bleeding of dye immediately after the image formation. Moreover, in Comparative Examples 4, 5 and 6 in which the values of (0.2×A1)+(0.8×A2) were 25.6, 26.0 and 25.6, respectively, each had an unsatisfactory result in the evaluation of the bleeding of dye after elapse of a long period of time since the image formation.

As described above, in a case of performing printing of an image on fabric with a dye ink by the ink-jet system, the image forming method and the ink set used in the image forming method of the present teaching are each capable of suppressing any bleeding of the dye in a printed matter obtained by printing the image on the fabric, and are capable of improving the water resistance of the printed matter, as well as applicable to printing on a recording paper (paper sheet). The way of use or application of the image forming method and the ink set of the present teaching are not specifically limited, and are widely applicable to the image formation on a variety of kinds of recording media.

What is claimed is:

1. An image forming method for forming an image on a recording medium which is a fabric or a recording paper by using an ink set including an ink and a treatment agent,
   in a case that the recording medium is the fabric, the image forming method comprising:
      applying the treatment agent, which includes a cationic substance and a water-soluble organic solvent, to the fabric in an application amount of the treatment agent per an area of the fabric in a range of 4.7 mg/cm$^2$ to 34 mg/cm$^2$;
      drying the applied treatment agent and thereby reducing weight of the treatment agent in the fabric to be not more than 50% of the application amount of the treatment agent; and
      jetting the ink, which includes an anionic dye and a water-soluble organic solvent, onto the fabric by an ink-jet system,
   wherein the ink and the treatment agent satisfy the following expression (1):

$$(0.2 \times A1) + (0.8 \times A2) < 25 \quad (1)$$

in the expression (1),
   A1: a blending amount (% by weight) of a water-soluble organic solvent, of which boiling point is not less than 230° C., in an entire amount of the ink, and
   A2: a blending amount (% by weight) of a water-soluble organic solvent, of which boiling point is not less than 230° C., in an entire amount of the treatment agent.

2. The image forming method according to claim 1, wherein in the drying of the applied treatment agent, the weight of the treatment agent in the fabric is reduced to be not more than 30% of the application amount of the treatment agent.

3. The image forming method according to claim 1, wherein the ink and the treatment agent satisfy the following expression (2):

$$(0.2 \times A1) + (0.8 \times A2) < 18 \quad (2)$$

in the expression (2),
- A1: the blending amount (% by weight) of the water-soluble organic solvent, of which boiling point is not less than 230° C., in the entire amount of the ink, and
- A2: the blending amount (% by weight) of the water-soluble organic solvent, of which boiling point is not less than 230° C., in the entire amount of the treatment agent.

4. The image forming method according to claim 1, wherein in the drying of the applied treatment agent, a drying temperature is in a range of 130° C. to 220° C.

5. The image forming method according to claim 1, wherein the applying of the treatment agent, the drying of the applied treatment agent and the jetting of the ink are performed in this order.

6. The image forming method according to claim 1, further comprising washing the fabric with water, wherein the applying of the treatment agent, the drying of the applied treatment agent, the jetting of the ink, and the washing of the fabric are performed in this order.

7. The image forming method according to claim 1, in a case that the recording medium is the recording paper, the image forming method comprising:
applying the treatment agent to the recording paper; and
jetting the ink onto the recording paper by the ink-jet system.

8. The image forming method according to claim 1, in a case that the recording medium is the recording paper, the image forming method comprising jetting the ink onto the recording paper by the ink-jet system without applying the treatment agent to the recording paper.

9. The image forming method according to claim 1, further comprising determining which one among a first printing mode, a second printing mode and a third printing mode is to be performed,
wherein in the first printing mode, the recording medium is the fabric, and the image forming method comprises the applying of the treatment agent, the drying of the applied treatment agent, and the jetting of the ink;
in the second printing mode, the recording medium is the recording paper, and the image forming method comprises jetting the ink onto the recording paper by the ink-jet system, without applying the treatment agent to the recording paper; and
in the third printing mode, the recording medium is the recording paper, and the image forming method comprises applying the treatment agent to the recording paper, and jetting the ink onto the recording paper by the ink-jet system.

10. An ink set comprising:
an ink including an anionic dye and a water-soluble organic solvent; and
a treatment agent including a cationic substance and a water-soluble organic solvent,
wherein the ink and the treatment agent satisfy the following expression (1):

$$(0.2 \times A1) + (0.8 \times A2) < 25 \quad (1)$$

in the expression (1),
- A1: a blending amount (% by weight) of a water-soluble organic solvent, of which boiling point is not less than 230° C., in an entire amount of the ink, and
- A2: a blending amount (% by weight) of a water-soluble organic solvent, of which boiling point is not less than 230° C., in an entire amount of the treatment agent.

11. The ink set according to claim 10, wherein a blending amount of a water-soluble organic solvent, of which boiling point is in a range of not less than 130° C. and less than 230° C., is not more than 50% by weight in the entire amount of the treatment agent.

12. The ink set according to claim 11, wherein the blending amount of the water-soluble organic solvent, of which boiling point is in the range of not less than 130° C. and less than 230° C., is in a range of 5% by weight to 40% by weight in the entire amount of the treatment agent.

13. The ink set according to claim 11, wherein the water-soluble organic solvent, which is included in the treatment agent and of which boiling point is in the range of not less than 130° C. and less than 230° C., is at least one of alkylene glycol and trimethylol alkyl.

14. The ink set according to claim 10, wherein the water-soluble organic solvent included in the treatment agent includes a penetrant.

15. The ink set according to claim 14, wherein a blending amount of the penetrant in the entire amount of the treatment agent is in a range of 0.4% by weight to 10% by weight.

16. The ink set according to claim 10, wherein the treatment agent further includes a surfactant which is different from a cationic surfactant.

17. The ink set according to claim 16, wherein the surfactant which is included in the treatment agent and which is different from the cationic surfactant is an acetylenic glycol-based nonionic surfactant represented by the following formula (S):

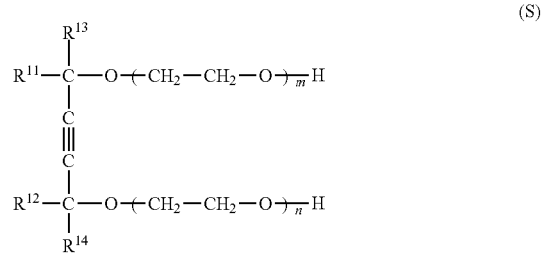

in the formula (S),
each of $R^{11}$ to $R^{14}$ is an alkyl group having 1 to 5 carbon atoms, and $R^{11}$ to $R^{14}$ are identical with one another or different from one another;
m and n are identical with each other or different from each other and are numbers, respectively, satisfying: m+n=1 to 15; and
the alkyl group of each of $R^{11}$ to $R^{14}$ has a straight chain or a branched chain.

18. The ink set according to claim 16, wherein a blending amount of the surfactant which is different from the cationic surfactant is in a range of 0.2% by weight to 2% by weight in the entire amount of the treatment agent.

19. The ink set according to claim 10, wherein the cationic substance is a cationic polymer including a urethane structure.

20. The ink set according to claim 10, wherein the anionic dye is at least one selected from the group consisting of: a yellow dye, a magenta dye and a cyan dye;
  the yellow dye is an azo dye;
  the magenta dye is at least one of an azo dye and an anthrapyridone dye; and
  the cyan dye is a phthalocyanine dye.

\* \* \* \* \*